United States Patent [19]
Dorschner et al.

[11] 3,885,953
[45] May 27, 1975

[54] META-UREIDOPHENYL N-HALOALKYL CARBAMATES AS HERBICIDES

[75] Inventors: Kenneth P. Dorschner; James A. Albright, both of Jacksonville, Fla.

[73] Assignee: SCM Corporation, New York, N.Y.

[22] Filed: Jan. 28, 1974

[21] Appl. No.: 436,908

Related U.S. Application Data

[62] Division of Ser. No. 211,118, Dec. 22, 1971, Pat. No. 3,806,537.

[52] U.S. Cl............................ 71/106; 71/99
[51] Int. Cl.............................. A01n 9/24
[58] Field of Search................... 71/106, 99

[56]     References Cited
     UNITED STATES PATENTS

| | | | |
|---|---|---|---|
| 3,404,975 | 10/1968 | Wilson et al. | 71/106 |
| 3,434,822 | 3/1969 | Wilson et al. | 71/106 |
| 3,592,949 | 7/1971 | Teach et al. | 71/106 |

FOREIGN PATENTS OR APPLICATIONS

| | | | |
|---|---|---|---|
| 6,614,472 | 4/1967 | Netherlands | 71/106 |

*Primary Examiner*—Glennon H. Hollrah
*Attorney, Agent, or Firm*—A. Joseph Gibbons; Merton H. Douthitt

[57]       ABSTRACT

New meta-3-alkylated ureido or thioureido phenyl carbamates and thiocarbamates wherein at least one valence of the carbamate nitrogen is satisfied by a halogen-substituted lower alkyl group are shown to be selective herbicides.

9 Claims, No Drawings

META-UREIDOPHENYL N-HALOALKYL CARBAMATES AS HERBICIDES

This is a division of application Ser. No. 211,118 filed Dec. 22, 1971, now U.S. Pat. No. 3,806,537.

BACKGROUND OF THE INVENTION

U.S. Pat. No. 3,434,822 is believed to show compounds which are the closest analogs to those of the instant invention. The compounds of that patent are ureidophenyl and thioureidophenyl carbamates and thiocarbamates, and are described as being soil sterilants or herbicides used to eradicate all plant species. Additional generally relevant art known to the applicants is listed in an attachment to this application.

It has been found that a certain specific substituent radical satisfying a valence of the carbamate nitrogen of the foregoing ureidophenyl carbamates and their thio analogs provides the crop grower with a selective herbicide, i.e. a compound or composition which will kill or stunt the growth of weeds in a germinating or growing crop without harming the plant crop beyond the point of recovery.

BRIEF SUMMARY OF THE INVENTION

In summary this invention relates to: new m-3-alkylated ureido or thioureidophenyl carbamates and their corresponding thiocarbamates wherein at least one valence of the carbamate nitrogen is satisfied with a halogen-substituted lower alkyl group; such compounds as herbicides including compositions comprising a selectively effective herbicidal amount of such compound; and a method of protecting crop plants including peanuts, soybean, and rice from undesirable weed growth by depositing a selectively effective herbicidal amount of such compounds to the locus of the plant crop.

DETAILED DESCRIPTION OF THE INVENTION

The novel ureidophenyl carbamates of this invention include the corresponding thioureido and thiocarbamate derivatives of the type characterized in that at least one of the valences of the carbamate nitrogen is satisfied by a halogen-substituted lower alkyl group and the second valence is satisfied by either hydrogen, a lower alkyl group, or by a halogen-substituted lower alkyl group depicted generally as:

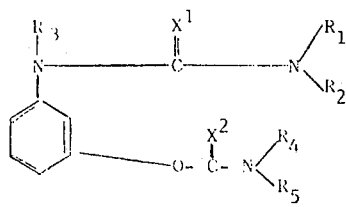

Wherein $X^1$ and $X^2$ represent either oxygen or sulfur; $R_1$ and $R_3$ represent hydrogen or a lower alkyl group, $R_2$ represents a lower alkyl group, $R_4$ represents either hydrogen, a lower alkyl group or a halogen-substituted lower alkyl group and $R_5$ represents a halogen-substituted lower alkyl group. Unless otherwise defined lower alkyl group signifies a straight or branched chain alkyl group of 1 to 6 carbon atoms.

Of the above-illustrated m-ureidophenyl carbamates, m-ureidophenyl thiocarbamates, m-thioureidophenyl carbamates, and m-thioureidophenyl thiocarbamates, the m-ureidophenyl carbamates presently appear to be the most effective and economical. Surprisingly, the novel compounds of this invention have been found to control selectively undesired weeds when used as pre-plant, pre-emergent and post-emergent herbicides for crop plants, in contrast to the general herbicide and soil sterilization properties of the analogs described in U.S. Pat. No. 3,434,822.

The novel compounds of this invention may be prepared by general methods described in the literature for the synthesis of ureidophenyl carbamates and their intermediates. The preferred method is usually to react an m-ureidophenol or an m-thioureidophenol with an alkyl isocyanate or thioisocyanate, which reaction may usually be catalyzed with amines, diaza compounds, or with organotin compounds as practiced in the art. When applicable, it is preferred to use as catalyst for these reactions dibutyltin diacetate as is later shown in the best mode examples. We have found that the tertiary amine catalysts are less desired in the haloalkyl carbamate series, probably due to competing quaternization reactions which can take place between a halide and a tertiary amine. Other methods such as treating the sodium salt of the desired m-ureidophenol with N- or N,N-disubstituted amino carbamoyl halide using a base such as triethylamine in an inert solvent is sometimes a desired alternate method. Other synthetic approaches involve the reaction of phosgene with the phenol followed by reaction with the appropriate primary or secondary amine. Alternatively, the carbamate esterfied with an aminophenol group can be reacted further with the appropriate alkyl isocyanate by usual techniques to form the desired ureidophenyl carbamate.

Examples of halogen substituted lower alkyl groups of about 1 to 6 carbon atoms on the carbamate nitrogen include methyl, ethyl, n-propyl, isopropyl, butyl, sec-butyl, tert-butyl, pentyl and hexyl groups and their isomers. The halogen atom substitution can be at any of the carbons of the alkyl group, but compounds of this type where the halogen is on the terminal carbon atoms are preferred because of their availability and because they have been found especially effective. Plural halogen substitution on the same or different carbon atoms is possible. The halogen atom substituent can be chlorine, iodine, bromine or fluorine but is preferably chlorine since the chloroalkyls are highly effective and economical to prepare. When $R_1$, $R_2$, $R_3$, and $R_4$ in the above formula represent lower alkyl groups, methyl and ethyl groups are generally preferred because of their economy.

Specific compounds illustrative of the formula which are very effective and selective in eliminating and controlling weeds including mustard (*Brassica spp.*), coffee weed (*Sesbania spp.*), pigweed (*Amaranthus spp.*), crabgrass (*Digitaria spp.*), barnyardgrass (*Echinochloa spp.*), giant foxtail (*Setaria spp.*), annual morningglory (*Ipomoea spp.*), Texas panicum (*Panicum texanum*), and the like without significant injury to the specific crop such as rice, corn, cotton, peanuts and soybean are as follows:

O-[m-(3-methylureido)phenyl] N-(2-chloroethyl) carbamate

O-[m-(3,3-Dimethylureido)phenyl] N-(2-chloroethyl) carbamate

O-[m-(3,3-Dimethylureido)phenyl] N-(3-chloropropyl) carbamate

O-[m-(3,3-Dimethylureido)phenyl] N-(2-chloropropyl) carbamate

S- [m-(3,3-Dimethylureido)phenyl] N-(2-chloroethyl)thiocarbamate

S- [m-(3-isopropylureido)phenyl] N-(3-chloropropyl) thiocarbamate

O- [m-(3,3-Dimethylureido)phenyl] N-(2-chloroethyl) thiocarbamate

O- [m-(3,3-Dimethylureido)phenyl] N-(3-chloropropyl) thiocarbamate

O- [m-(3,3-Dimethylureido)phenyl] N-(2-bromethyl) carbamate

The compounds of this invention can also be named as carbamic acids, esters with various ureas or as carbamates according to the IUPAC Rules, examples of which are:

(2-Chloroethyl) carbamic acid, ester with 3-(m-hydroxyphenyl)-1,1-dimethylurea or m-(3,3-Dimethylureido)phenyl (2-chloroethyl) carbamate By crop plants is generally meant agricultural crops which are used for food supply of man and animals, but this also includes other desirable plants such as grass and lawn grass species where undesirable broadleaved and grassy weeds are to be controlled, suppressed, or eradicated.

Although climatic and soil conditions dictate the desirable application rate of these N-(halogen-substituted alkyl) carbamates, they are generally used from about ⅛ to about 8 pounds per acre based on the weight of the N-haloalkyl carbamate in the composition. Smaller amounts than ⅛ and amounts greater than 8 pounds per acre can be utilized, depending on the crop to be protected and the undesirable weed species to be killed. Conventional formulations can be used to apply these herbicides. Wettable powders can be formulated from inert carriers such as clays, talc, diatomaceous earth, and other siliceous inorganic solids and silicates. Although the wettable powder can contain any proportion of active herbicide from 1 to 98 percent, it is generally more economically feasible to use a high loading of active selective herbicide material. Active ingredient concentrations of 50–90 percent based on weight of inert carrier is recommended, and concentrations in the order of 80 weight percent active ingredient are preferred. It is desirable that both the inert carrier and herbicide, if solids, be ball-milled or ground by other common techniques to a very fine state of subdivision so that they will pass through a 325-mesh screen (U.S. Standard Sieve).

The formulation can contain various other agents to wet, disperse, and emulsify the herbicidal composition whether or not a solvent is used in the application to the locus of the plant or to the soil. The surfactants or other detergents employed can be anionic, nonionic, or cationic as are detailed in McCutcheons 1969 publication on *Detergents and Emulsifiers*. Surfactants, useful in formulation of our selective herbicides, are usually added in amounts of 1 to 10 percent based on the total weight of wettable powder formulation but generally in the order of 2 percent. These can be alkyl and alkylaryl polyether alcohols, polyoxy ethylene sorbitols, or sorbitan fatty acid esters, alkylaryl sulfonates, long chain quaternary ammonium chlorides, and the like. Preferred surfactants are the fatty esters of inorganic salts of isethionic acid, and especially preferred is the oleic ester of sodium isethionate.

Water emulsions may be prepared with the aid of emulsifiers such as triethanol amine stearate, sodium lauryl sulfonate, sodium alkyl naphthalene sulfonate, sodium oleate, p-t-octylphenoxypolyethoxy ethanol, as well as other well-known emulsifiers in appropriate solvents. The compounds of this invention are best applied as herbicides as a broadcast treatment whereby the compound is emulsified in water or suspended as a wettable powder formulated with wetting agents and applied as an aqueous spray over the entire area of land, which can include the crop plant. Also they may be applied in a banded manner — only over the planted row. These herbicides can be applied in a variety of ways, as a pre-plant treatment to the area before the crop is planted, as a pre-emergence treatment made before the crop or weeds emerge from the soil or as a post-emergence foliar spray. The compounds of this invention, as shown in Examples, can be effectively used by any of the above treatments. The characteristic of a good selective herbicide is that when it is applied near or on the foliage of the crop plant, only the weed species are killed while the valuable crop plants are not harmed and develop normally. In this respect the compounds of this invention differ considerably from the m-ureidophenyl carbamates of the prior art which were found to be non-selective herbicides useful as soil sterilants as shown in U.S. Pat. No. 3,434,822 for total plant eradication.

The following examples are intended to illustrate the invention but not to limit the scope thereof, parts and percentages being by weight unless otherwise specified.

EXAMPLE 1

3-(m-hydroxyphenyl)-1,1-dimethylurea

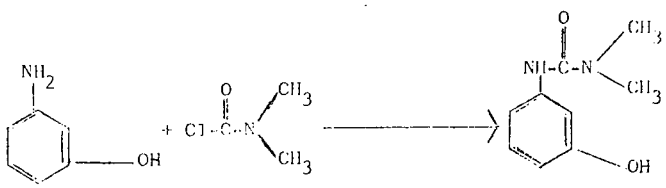

To a solution of 33 grams (0.3 mole) m-aminophenol in 300 ml. of 1,2-dimethoxyethane was added 16 grams (0.15 mole) dimethylamino carbonyl chloride and the solution was stirred magnetically at room temperature overnight. The solvent was removed by distillation under vacuum and the resulting oil stirred with 100 ml of water. A tan solid separated and was filtered to yield 20 grams of crude 3-(m-hydroxyphenyl)-1,1-dimethylurea, m.p. 195°–200°C.

EXAMPLE 2

O- [m-(3,3-dimethylureido)phenyl] N-(2-chloroethyl) carbamate

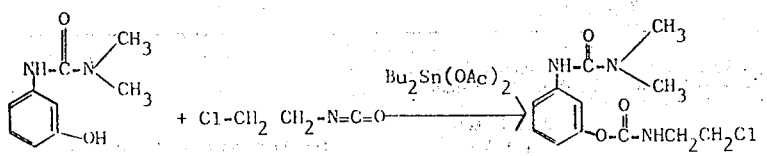

Analysis: Calcd. for: $C_{13}H_{18}ClN_3O_3$; C, 52.0; H, 6.04; N, 14.0.
Found: C, 51.78; H, 6.05; N, 13.76.

A mixture of 14 grams (.078 mole) crude 3-(m-hydroxyphenyl)-1,1-dimethylurea, 8.5 grams (.08 mole) of 2-chloroethylisocyanate, and 1 ml of dibutyltin diacetate was stirred until uniformly mixed. An exothermic reaction developed and after a few minutes the mixture solidified. After standing one hour at room temperature, the resulting solid was washed with hexane and filtered, yielding 22 grams of product melting at 170°–177°C. Recrystallization from ethanol gave a pure product, m.p. 188°–190°C.

Analysis: Calcd. for: $C_{12}H_{16}ClN_3O_3$; C, 50.3; H, 5.61; N, 14.7; Cl, 12.4.
Found: C, 49.8; H, 5.67; N, 14.45; Cl, 12.53.

EXAMPLE 3

O-[m-(3,3-dimethylureido)phenyl] N-(4-chlorobutyl) carbamate

In a manner similar to Example 2 the crude 3-(m-hydroxyphenyl)-1,1-dimethyl urea was reacted with 4-chlorobutylisocyanate to yield the desired product which, when recrystallized from ethyl acetate, had an m.p. of 148°–151°C.

EXAMPLE 4

S-[m-(3-isopropylureido)phenyl] N-(2-chloroethyl) thiocarbamate

In a manner similar to Example 2, 3-(m-mercaptophenyl)-1-isopropyl-urea can be reacted with a molar equivalent of 2-chloroethylisocyanate to produce the desired compound.

EXAMPLE 5

O-[m-(3,3-Dimethylureido)phenyl] N-(2-bromoethyl) carbamate

In a manner similar to Example 2, 3-(m-hydroxyphenyl)-1,1-dimethylurea was reacted with 2-bromoethylisocyanate to yield the desired compound exhibiting an m.p. 157°–160°C. after recrystallization from ethanol.

Analysis: Calcd. for: $C_{12}H_{16}BrN_3O_3$; C, 43.7; H, 4.89; N, 12.7
Found: C, 43.48; H, 4.86; N, 12.39.

EXAMPLE 6

O-[-m-(3,3-Dimethylureido)phenyl] N-(3-chloropropyl) carbamate

In a manner similar to Example 2, except that 3-chloropropyl-isocyanate was used, the desired compound was formed and exhibited an m.p. of 151°–152°C. after recrystallization from ethyl acetate.

EXAMPLE 7

O-[m-(3,3-Dimethylureido)phenyl] N-(2-chloropropyl) carbamate

In a manner similar to Example 2, except that 2-chloropropylisocyanate was used, the desired compound was formed and exhibited an m.p. of 145°–147°C after recrystallization from ethanol.

EXAMPLE 8

O-[m-(3-methylureido)phenyl] N-(2-chloroethyl) carbamate

Meta aminophenol (22 grams, 0.2 mole) was dissolved in 200 ml of dioxane and 14 grams (0.2 mole) methylisocyanate was added dropwise to the magnetically stirred solution. An exothermic reaction developed and a white solid separated yielding 32 grams of crude 3-(m-hydroxyphenyl)-1-methylurea melting at 135°–140°C.

This crude product was reacted with 2-chloroethyl isocyanate as described in Example 2 to give the desired product which exhibited an m.p. of 174°–176°C. after recrystallization from ethanol.

EXAMPLE 9

Compounds prepared as shown in Examples 2, 5, 6 and 8 were tested as post-emergence herbicides for the protection of peanuts when applied at 4.0 and 1.5 pounds active ingredient per acre broadcast. All compounds were formulated as wettable powders and applied as an aqueous spray to the foliage of the plant. The various treatments were evaluated and rated 21 days after application as shown in Table 1. The control used in this test was an analog of the compounds of this invention, but differed in that the N-substituted alkyl group on the carbamate nitrogen was not halogen substituted. This control, O-[m-(3,3-Dimethylureido)phenyl] N-ethyl carbamate, is described in Example 3 of U.S. Pat. No. 3,434,822. It is readily seen that when applied at broadcast rates of 4 and 1.5 pounds active ingredients per acre, the compounds of the present invention have a remarkable selectivity for protecting the peanut crop and are significantly superior to the prior art control which is not so halogen substituted.

Table 1

Response of Test Plants to Post Emergence Treatments With
N-Haloalkyl m-ureidophenyl Carbamates

| Compounds of | Pounds Active per Acre | Test Plant Species - Percent Kill | | | | |
|---|---|---|---|---|---|---|
| | | Mustard | Peanuts | Coffeeweed | Crab Grass | Barnyard-Grass |
| Example 2 O-[m-(3,3-Dimethylureido)phenyl] N-(2-chloroethyl) carbamate | 4.0 | 100 | 0[b] | 100 | 100 | 100 |
| " | 1.5 | 100 | 0[a] | 100 | 100 | 100 |
| Example 6 O-[-m-(3,3-Dimethylureido)phenyl] N-(3-chloropropyl)carbamate | 4.0 | 100 | 0[a] | 100 | 100 | 100 |
| " | 1.5 | 100 | 0[a] | 100 | 100 | 100 |
| Example 8 O-[m-(3-Methylureido)phenyl] N-(2-chloroethyl) carbamate | 4.0 | 100 | 0[a] | 95 | 100 | 90 |
| " | 1.5 | 100 | 0[a] | 90 | 95 | 80 |
| Example 5 O-[m-(3,3-Dimethylureido)phenyl] N-(2-bromoethyl) carbamate | 4.0 | 100 | 0[a] | 100 | 95 | 65[c] |
| " | 1.5 | 100 | 0[a] | 70[b] | 0 | 0[b] |
| Standard:* O-[m(3,3-Dimethylureido)phenyl] N-Ethyl carbamate | 4.0 | 100 | 95[c] | 100 | 100 | 100 |
| " | 1.5 | 100 | 35[c] | 100 | 100 | 100 |

Plant Vigor Ratings: (Remaining Plants)
[a]No injury; plants similar to untreated control
[a]Slight injury; plants only slightly behind control
[c]Moderate injury; plants will recover
[d]Moderate injury; plants may or may not recover
[e]Severe injury; plants will eventually die.
*Described in U.S. Patent 3,434,822.

EXAMPLE 10

Compounds prepared as shown in Examples 2, 5, 6, and 8 were tested as pre-emergence herbicides for the protection of peanuts when applied at 4.0 and 1.5 pounds active ingredient per acre broadcast. All compounds were formulated as wettable powders and applied as an aqueous spray to the soil surface of flats seeded to the plant species listed in the attached Table 2. Evaluations were made 21 days after first appearance of the plant crop. As seen in Table 2 these compounds are remarkably more selective toward peanuts than the control compound disclosed in U.S. Pat. No. 3,434,822 when applied at the same broadcast rates.

EXAMPLE 11

M-(3,3-dimethylureido)phenyl (2-chloroethyl) carbamate was tested as pre-emergence, post-emergence and soil-incorporated herbicide and compared with the widely used control herbicide, 3-amino-2,5-dichlorobenzoic acid ("Amiben") by applying both at 3.2, 1.6, 0.8, 0.4 and 0.2 lbs. active ingredient per acre broadcast. The carbamate was formulated as a 50% wettable powder and Amiben was used as the commercial emulsifiable concentrate. Evaluations were made with soybean, rice, corn and cotton plant species to be protected against growth of the weed species, mustard, coffeeweed, pigweed, crabgrass and barnyardgrass.

Table 2

Response of Test Plants to Pre-Emergence Treatments With
N-Haloalkyl m-ureidophenyl Carbamates

| Compounds of: | Pounds Active Per Acre | Test Plant Species - Percent Kill | | | | |
|---|---|---|---|---|---|---|
| | | Mustard | Peanuts | Coffeeweed | Crab Grass | Barnyard-Grass |
| Example 2 O-[m-(3,3-Dimethylureido)phenyl] N-(2-chloroethyl) carbamate | 4.0 | 95 | 0[a] | 100 | 100 | 100 |
| " | 1.5 | 60 | 0[a] | 90 | 90 | 80 |
| Example 6 O-[m-(3,3-Dimethylureido)phenyl] N-(3-chloropropyl) carbamate | 4.0 | 100 | 0[a] | 100 | 100 | 100 |
| " | 1.5 | 95 | 0[a] | 95 | 85 | 95 |
| Example 8 O-[m-(3-Methylureido)phenyl] N-(2-chloroethyl) carbamate | 4.0 | 30 | 0[a] | 50 | 85 | 90 |
| " | 1.5 | 20 | 0[a] | 20 | 0 | 0 |
| Example 5** O-(3,3-Dimethylureido)phenyl N-(2-bromoethyl) carbamate | 4.0 | 0 | 0 | 0 | 0 | 0 |
| " | 1.5 | 0 | 0 | 0 | 0 | 0 |
| Standard:* O-[m-(3,3-Dimethylureido)phenyl] N-Ethyl carbamate | 4.0 | 100 | 30[c] | 100 | 100 | 100 |
| " | 1.5 | 100 | 15[c] | 100 | 90 | 95 |

Plant Vigor Ratings:
[a]No injury; plants similar to untreated control
[a]Slight injury; plants only slightly behind control
[b]Moderate injury; plants will recover
[d]Moderate injury; plants may or may not recover
[e]Severe injury; plants will eventually die.
*described in U.S. Patent 3,434,822.
**Note the effectiveness of this composition as a post-emergent herbicide in Table 1 in contrast with this showing.

EXAMPLE 12

M- (3,3-dimethylureido)phenyl (2-chloroethyl) carbamate was tested as a post-emergent herbicide according to the procedure shown in Example 11 and is compared with the commercial herbicide 3-amino-2,5-dichlorobenzoic acid (Amiben) at a broadcast rate of 0.8 and 0.4 pounds active ingredient per acre as seen in Table 3. At the 0.8 pounds per acre application level, corn is fully protected and the weed species are controlled. Optimum application of less than 0.8 pounds and more than 0.4 pounds per acre applied as a post-emergent herbicide to selectively protect corn, rice, and soybean is indicated.

It is further seen that this 2-chloroethyl carbamate applied as a post-emergent herbicide at 0.4 pounds per acre is vastly superior to one of the better known pre-emergence herbicides applied as a pre-emergent herbicide at the same application level.

EXAMPLE 13

M- (3,3-dimethylureido)phenyl (2-chloroethyl) carbamate, formulated as indicated in Example 11, was incorporated into the soil at broadcast levels of 0.4 and 0.8 pounds per acre and compared with the known control herbicide, Amiben. Table 4 shows that soil-incorporation of the above carbamate results in a selectivity in favor of soybean, rice, corn and cotton at broadcast rates between 0.4 and 0.8 pounds per acre.

EXAMPLE 14

O-[m- (3,3-dimethylureido)phenyl] N-(2-chloroethyl) carbamate was formulated as a wettable powder and applied as a preplant soil incorporated herbicide using a spraying device calibrated to deliver approximately 28 psi pressure and operating at 2 mph with 8004 nozzles placed 18 inches above ground level thus giving application levels of 1.25, 2.50, and 5.0 pounds active ingredient per acre. As a standard reference, $\alpha,\alpha,\alpha$-trifluoro-2,6-dinitro-N,N-dipropyl-p-toluidine ("TREFLAN") was similarly applied at an application level of 0.5 pounds active ingredient per acre. The crops used were peanuts, soybean, cotton, tomatoes, and radishes; the weeds used were watergrass, giant foxtail, annual Morningglory, and Texas panicum. Evaluations made at 16 days are shown in Table 5. Herbicidal effectiveness is rated on a 0 to 10 scale wherein 0 signifies no control, 5 is 50 percent control and 10 signifies 100 percent control. These results indicate the above 2-chloroethyl-carbamate compound is selective for soybeans and peanuts when applied at a broadcast level of 1.25 pounds active ingredient per acre and was more selective to certain crops than "Treflan" applied at 0.5 pounds per acre.

Table 3

Response of Test Plant Species to Chemical Treatment

| | m-(3,3-dimethylureido)phenyl (2-chloroethyl) Carbamate - Percent Kill | | Standard: "Amiben"* - Percent Kill | | |
|---|---|---|---|---|---|
| | Post Emergence | | Post Emergence | Pre Emergence | |
| Test Plant Species | 0.8 lb/acre | 0.4 lb/acre | 0.8 lb/acre | 0.8 lb/acre | 0.4 lb/acre |
| Mustard | 100 | 100 | 0 | 20 | 0 |
| Soybean | 50 | 0 | 0 | 0 | 0 |
| Coffeeweed | 100 | 100 | 0 | 20 | 0 |
| Rice | 10 | 0 | 0 | 0 | 0 |
| Pigweed | 100 | 100 | 100 | 100 | 20 |
| Corn | 0 | 0 | 0 | 0 | 0 |
| Crabgrass | 95 | 25 | 0 | 95 | 0 |
| Cotton | 100 | 80 | 0 | 100 | 0 |
| Barnyardgrass | 95 | 0 | 0 | 15 | 0 |

*3-amino-2,5-dichlorobenzoic acid

Table 4

Response of Test Plants to Soil-Incorporated Chemical Treatments

| | O-[m-(3,3-dimethylureido)phenyl] N-(2-chloroethyl) carbamate | | | | Standard 3-amino-2,5-dichlorobenzoic acid ("Amiben") | | | |
|---|---|---|---|---|---|---|---|---|
| | 0.4 No./Acre | | 0.8 No./Acre | | 0.4 No./Acre | | 0.8 No./acre | |
| Test Plant Species | Vigor" | %Kill | Vigor | %Kill | Vigor | %Kill | Vigor | %Kill |
| Mustard | | 100 | | 100 | 4 | 0 | 3 | 25 |
| Soybean | 3 | 0 | 2 | 0 | 4 | 0 | 2 | 0 |
| Coffeeweed | 3 | 50 | | 100 | 5 | 0 | 4 | 0 |
| Rice | 4 | 0 | 3 | 10 | 2 | 0 | 1 | 0 |
| Pigweed | 3 | 60 | | 100 | | 100 | | 100 |
| Corn | 5 | 0 | 3 | 0 | 5 | 0 | 4 | 0 |
| Crabgrass | 5 | 0 | 3 | 75 | 3 | 60 | | 100 |
| Cotton | 4 | 0 | 3 | 0 | 5 | 0 | | 100 |
| Barnyardgrass | 4 | 0 | 1 | 90 | 3 | 0 | | 75 |

"Vigor Rating: (Remaining Plants)
1 - Severe Injury, plants will eventually die
2 - Moderate Injury; plants may or may not recover
3 - Moderate Injury; plants will recover
4 - Slight Injury; plants only slightly behind control
5 - No Injury; plants similar to untreated control

Table 5

Response of Test Plant Species to Preplant Soil-Incorporated Chemical Treatments

| | Percent Control[a] | | | | | Annual | | | |
|---|---|---|---|---|---|---|---|---|---|
| | Cotton | Peanuts | Radishes | Soybeans | Tomatoes | Morning-Glory | Giant Foxtail | Texas Panicum | Water grass |
| O-[m-(3,3-Dimethylureido)phenyl] N-(2-chloroethyl)carbamate | | | | | | | | | |
| 1.25 pounds Active Ingredient/Acre | 8.0 | 2 | 10 | 1.6 | 9 | 9 | 10 | 8 | 10 |
| 2.50 pounds Active Ingredient/Acre | 9.6 | 7 | 10 | 4.6 | 10 | | | | |
| Standard: $\alpha,\alpha,\alpha$-trifluoro-2,6-dinitro-N,N-dipropyl-p-toluidine ("Treflan") | | | | | | | | | |
| 0.5 pounds Active Ingredient/Acre | 3 | 7 | 3.3 | 4.6 | 4.6 | | | | |
| Blank Control | 0 | 0 | 0 | 0 | 0 | 0 | 0 | 0 | 0 |

[a] Numbers shown for crops represent an average of three replicates at the same application level.
0 represents no control (damage) to the plant
10 represents 100 percent control Other compounds of the classes previously described may be synthesized by techniques similar to those illustrated above and well-known to those skilled in the art. These compounds, and others falling within the generic class presented above, may be formulated into selectively effective herbicidal compositions in a manner shown in the foregoing examples. Representative members of these compounds are:

EXAMPLE 15

S-[m-(3,3-Dimethylureido)phenyl] N-(2-chloroethyl)thiocarbamate

EXAMPLE 16

O-[m-(3,3-Dimethylureido)phenyl] N-(2-trifluoroethyl) thiocarbamate

EXAMPLE 17

O-[m-(3,3-Dimethylureido)phenyl] N-(3-fluoropropyl) thiocarbamate

EXAMPLE 18

O-[m-(3,3-Dimethyl-2-thioureido)phenyl] N-(4-chlorobutyl) carbamate

EXAMPLE 19

O-[m-(3,3-Dimethylureido)phenyl] N-(2,2-dichloroethyl) carbamate

EXAMPLE 20

O-[m-(3,3-Dimethylureido)phenyl] N,N-(cyclo 2,3-dichlorotetramethylene) carbamate

EXAMPLE 21

O-[m-(3,3-Dimethylureido)phenyl] N-(1-chloro-2-butyl) carbamate

What is claimed is:

1. A herbicidally effective composition comprising an inert carrier and 1–98% of a carbamate of the formula:

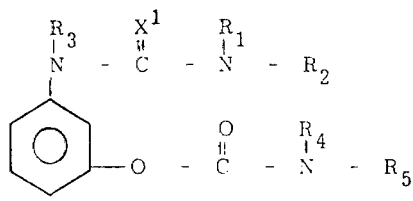

wherein $X^1$ represent oxygen or sulfur; $R_1$ and $R_3$ represent hydrogen or a lower alkyl group, $R_2$ represents a lower alkyl group, $R_4$ represents either hydrogen, a lower alkyl group or a halogen-substituted lower alkyl group and $R_5$ represents a halogen-substituted lower alkyl group.

2. A process for protecting crop plants from undesirable weed growth which comprises applying to the locus thereof a selectively effective herbicidal amount of carbamate of the formula:

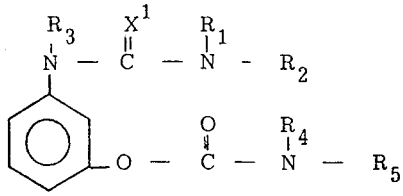

wherein $X^{11}$ represents oxygen or sulfur; $R_1$ and $R_3$ represent hydrogen or a lower alkyl group, $R_2$ represents a lower alkyl group, $R_4$ represents either hydrogen, a lower alkyl group or a halogen-substituted lower alkyl group and $R_5$ represents a halogen-substituted lower alkyl group.

3. The process of claim 2 wherein $R_4$ is hydrogen and $R_5$ is chlorinated or brominated lower alkyl.

4. The process of claim 2 wherein the carbamate is O-[m-(3,3-dimethylureido) phenyl] N-(2-chloroethyl) carbamate.

5. The process of claim 2 wherein the carbamate is O-[m-(3,3-dimethylureido)phenyl] N-(3-chloropropyl)carbamate.

6. The process of claim 2 wherein the carbamate is O-[m-(3,3-dimethylureido)phenyl] N-(2-chloropropyl) carbamate.

7. The process of claim 2 wherein the carbamate is O-[m-(3,3-dimethylureido)phenyl] N-(2-bromoethyl)-carbamate.

8. The process of claim 2 wherein the carbamate is O-[m-(3-methylureido)phenyl] N-(2-chloroethyl)carbamate.

9. The process of claim 2 wherein the carbamate is O-[m-(3,3-dimethylureido)phenyl] N-(4-chlorobutyl)carbamate.

* * * * *